United States Patent
Habedank

(10) Patent No.: US 7,086,700 B2
(45) Date of Patent: Aug. 8, 2006

(54) AUTOMOBILE SEAT

(75) Inventor: Klaus-Dieter Habedank, Stadthagen (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 10/969,818

(22) Filed: Oct. 21, 2004

(65) Prior Publication Data

US 2005/0093355 A1    May 5, 2005

(30) Foreign Application Priority Data

Nov. 3, 2003   (DE) ................................. 103 51 157

(51) Int. Cl.
B60N 2/02       (2006.01)

(52) U.S. Cl. .............................. 297/378.1; 297/452.34; 297/378.12; 297/284.4; 297/284.9

(58) Field of Classification Search ........... 297/378.12, 297/378.13, 452.33, 452.34, 284.9, 284.4, 297/378.1, 61

See application file for complete search history.

(56) References Cited

U.S. PATENT DOCUMENTS

| | | | |
|---|---|---|---|
| 3,929,374 A | 12/1975 | Hogan et al. .................. 61/297 |
| 4,671,569 A | 6/1987 | Kazaoka et al. ............. 284/297 |
| 4,938,529 A * | 7/1990 | Fourrey .................... 297/284.9 |
| 5,314,235 A * | 5/1994 | Johnson .................... 297/284.5 |
| 5,611,599 A * | 3/1997 | Baloche et al. ............. 297/367 |
| 5,681,083 A * | 10/1997 | Nelson et al. ............ 297/284.1 |
| 5,697,672 A | 12/1997 | Mitchell ...................... 284/297 |
| 5,941,602 A | 8/1999 | Sturt et al. .................. 340/297 |
| 6,068,336 A | 5/2000 | Schönauer |
| 6,152,533 A * | 11/2000 | Smuk ......................... 297/341 |
| 6,199,951 B1 | 3/2001 | Zeile et al. .................. 341/297 |
| 6,357,826 B1 * | 3/2002 | Gabas et al. ............. 297/284.4 |
| 6,464,299 B1 * | 10/2002 | Castagna ................ 297/378.12 |
| 6,554,360 B1 | 4/2003 | Wilke et al. ................. 342/297 |
| 6,659,557 B1 * | 12/2003 | Deptolla ..................... 297/367 |
| 6,736,460 B1 * | 5/2004 | Becker et al. ......... 297/378.12 |
| 6,755,467 B1 * | 6/2004 | Chu ........................ 297/284.1 |
| 6,805,405 B1 * | 10/2004 | Koo ......................... 297/284.7 |
| 2001/0028189 A1 * | 10/2001 | Klein ..................... 297/378.12 |
| 2004/0160100 A1 | 8/2004 | Forkel et al. |

FOREIGN PATENT DOCUMENTS

| | | |
|---|---|---|
| DE | 197 50 116 C2 | 5/1999 |
| DE | 198 36 907 C1 | 11/1999 |
| DE | 100 05 215 C2 | 9/2001 |
| WO | WO 03/022626 A1 | 3/2003 |
| WO | WO2004043207 | 5/2004 |
| WO | WO2004043730 | 5/2004 |

* cited by examiner

Primary Examiner—Peter M. Cuomo
Assistant Examiner—Erika Garrett
(74) Attorney, Agent, or Firm—Bourque & Associates

(57) ABSTRACT

An automobile seat with supporting frame, upholstery, and seat cover includes a seat body and a seat back, as well as at least one seat back region, such as a side wing on the seat back, whose height and shape in its use position extends forward over the central shape of the seat back. An elastic adjustment element and actuation medium for the adjustment element are positioned within the seat back or the side wing. The adjustment element and the deformed region in the seat back such as the side wing are so deformed by the actuation medium when the seat back is tilted forward from the use position into the tilted-forward position that the height of the seat back portion, such as the side wing, extending over the central shape is less than when in the use position.

14 Claims, 4 Drawing Sheets

AUTOMOBILE SEAT

TECHNICAL FIELD

The invention relates to an automobile seat and more particularly, to an automatic seat back support adjustment mechanism.

BACKGROUND INFORMATION

In a known automobile seat, the back support adjustment mechanism includes an elastic adjustment element in the from of a hoop that is essentially deformable because of its shape. Special drive devices are provided for the actuation medium of the adjustment element that firmly engage with longitudinally-displaceable counter-elements on the hoop. Such actuation mediums must be adjusted either using a motor or by hand.

Further, an automobile seat with a tiltable seat back is known whose seat base includes a central seat area and at least one side wing whose shape in the use position extends upward or outward with respect to the shape of the central seat area. The side wing of the seat base may be moved downward with respect to the central seat area so that the upper shape of the side wing projects slightly more with respect to the central seat area than when in the use position. The ability for the side wing to be lowered provided in this known solution allows tilting the seat back forward onto the seat base in such manner that the tilted seat back is horizontal. One disadvantage of the known solution is that the side wings are formed separately from the central seat area, and must be adjusted separately. Such a solution is relatively expensive and does not allow the seat surface to be largely formed as one piece.

It is also already known to tilt seat backs without side projections forward onto the seat base. When the front side of the seat back rests on the upper side of the seat base, the rear side of the seat back in such designs is not horizontal, but rather increasingly oblique forward. In order for the seat back to achieve horizontal position, the upholstery of the seat back and seat base in such designs are pressed together to the extent that the desired horizontal position results. The seat back is then secured in the horizontal position achieved by exertion of force.

Starting from this state of the art, it is the challenge of the invention to provide an automobile seat of the known type so that its construction is simple, and that its seat back may be tilted forward from the use position into the tilted non-use position with horizontal alignment of the seat back rear side.

SUMMARY

The invention takes advantage of the tilting motion of the seat back when it is tilted forward in that it automatically alters the height and shape of at least a portion of the seat back, such as the side wings, projecting forward in the use position during the tilting process to the extent that the rear side of the seat back is horizontal when it is tilted forward. The actuation mechanism is simple because of the long lever arm formed by the seat back when it is swiveled about its pivot axis; no great force is required to alter the shape and height of the seat back portion such as the side wings as desired upon tilting the seat back forward.

The invention features an automobile seat with supporting frame, upholstery, and seat cover that includes a seat body and a seat back, as well as at least one region I nthe seat back, such as the side wing on the seat back, whose height and shape in its use position extends forward over the central shape of the seat back. The seat back portion such as the wing area includes an elastic adjustment element and actuation medium for the adjustment element that are positioned within the seat back portion. The adjustment element and the seat back portion in the seat back are so deformed by the actuation medium when the seat back is tilted forward from the use position into a tilted-forward position that the height of the side wing extending over the central shape is less than when in the use position.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
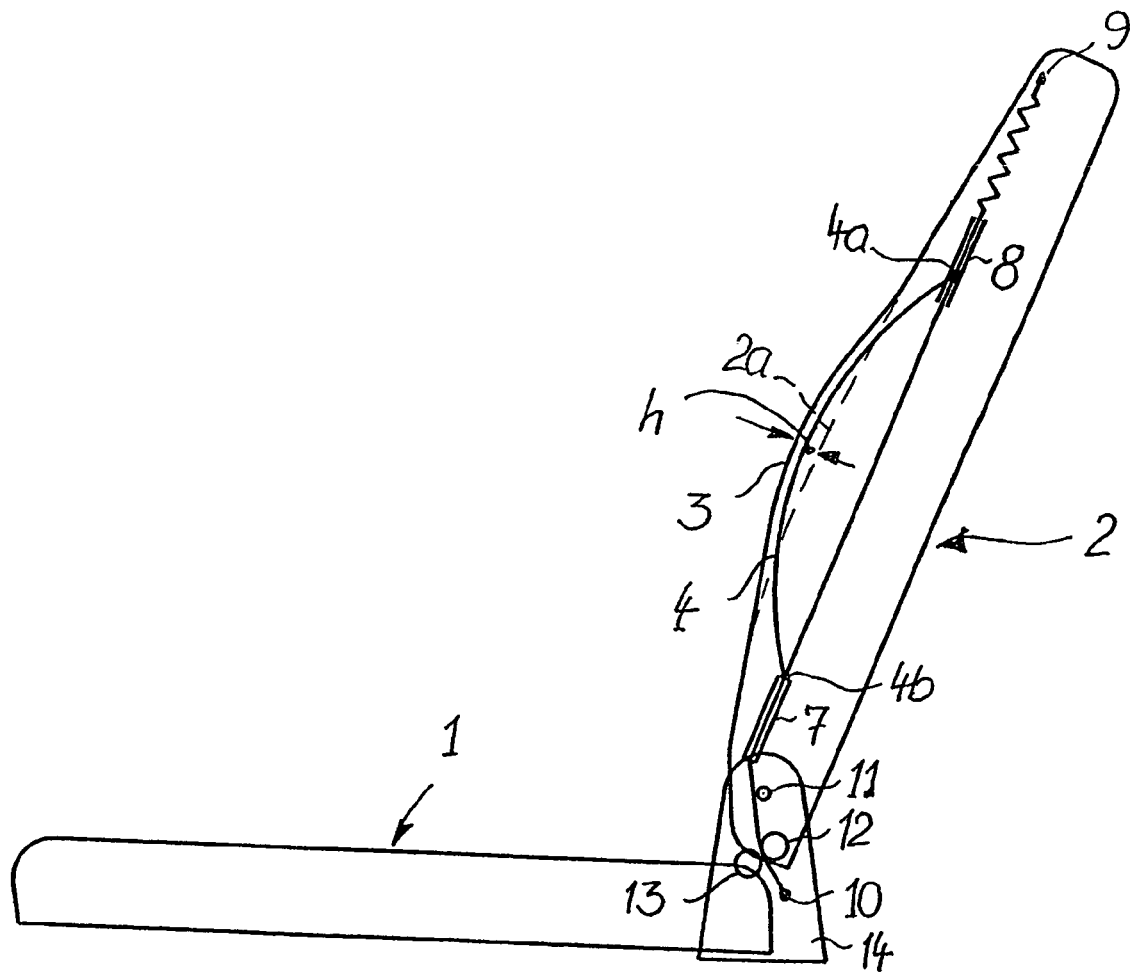
FIG. 1 a schematic side view of a automobile seat in use position showing the side wing entended.

An automobile shown seat schematically includes a seat base 1, FIG. 1, and a seat back 2. The seat back 2 is mounted to a chassis area 14 provided on both sides of the seat base so that it may be tilted about a horizontal seat-tilt axis 11.

The configuration of the seat back 2 visible in the illustrations on the left (driver's) side of the vehicle is identical to the one on the right. The seat back 2 thus possesses two side wings 3 on each side of the seat back 2.

The side wings 3 project by the height h with respect to the central shape 2a of the seat back 2. This height h is greatest when the seat back is in the use position.

Elastic adjustment elements shaped as hoop elements 4 are positioned within the seat back 2 on both sides within the side wings.

Figure 1A:
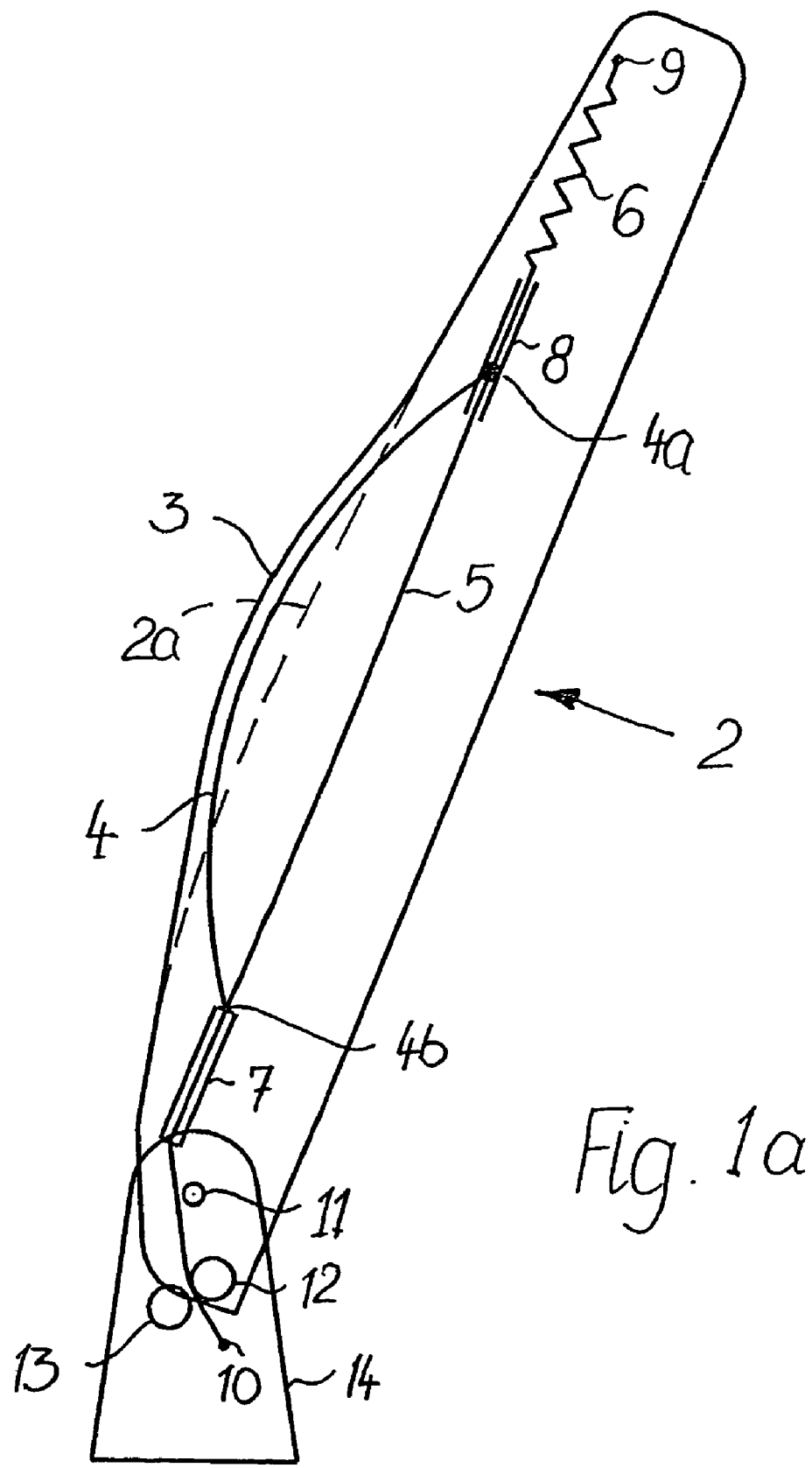
FIG. 1a is a more detailed view of the seatback as in FIG. 1 in the use position.

The upper ends of the hoop elements 4 are connected to the anchor points 4a and 4b with a pull cable 5, FIG. 1a, that is tensioned by a spring 6. Its lower end is attached via a pull-cable guide 7 at 4b. The spring 6 is connected to the anchor point 9 with the supporting frame of the seat back 2. The lower end of the pull-cable 5 is affixed to the anchor point 10 in the chassis area 14.

Two cable guides 7, 8 are positioned within the seat back 2 in fixed position, and are connected with the supporting frame of the seat back 2. The two cable guides 7 and 8 merge together. The pull-cable 5 is routed through the cable guide 7 and over pulleys 12 or 13 to the anchor point 10 in the chassis area 14.

It is also possible that the anchor point 4a may not move within the fixed cable guide 8, but rather the entire connection point consisting of cable guide 8, hoop element 4, pull-cable 5, and spring 6.

Figure 2:
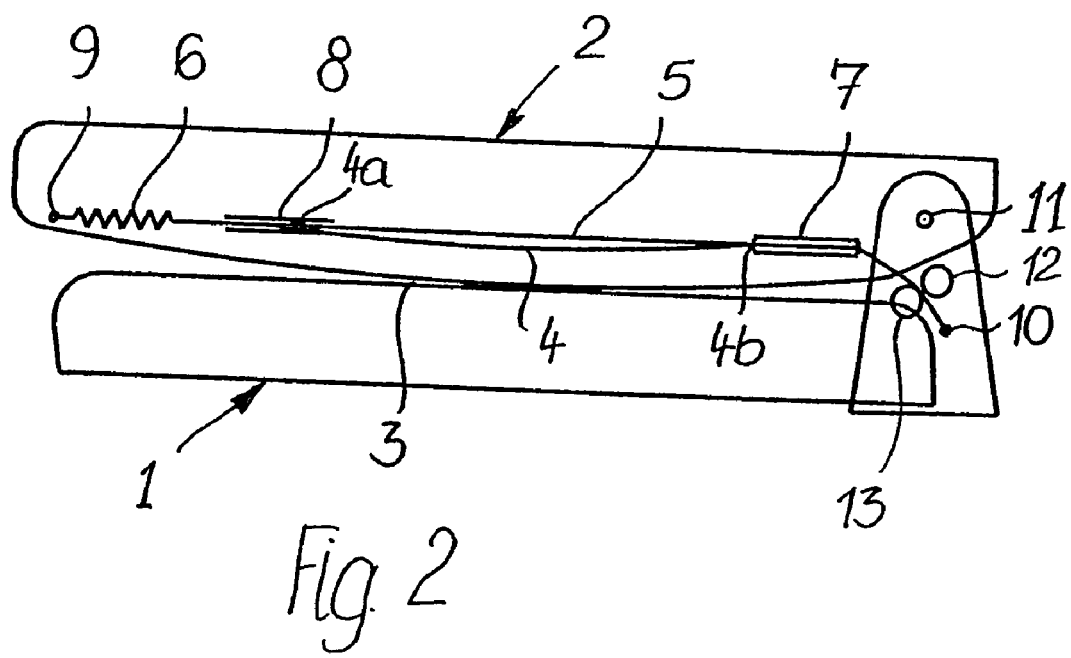
FIG. 2 a schematic view of the automobile seat as in FIG. 1 in tilted or folded position.
Figure 2A:
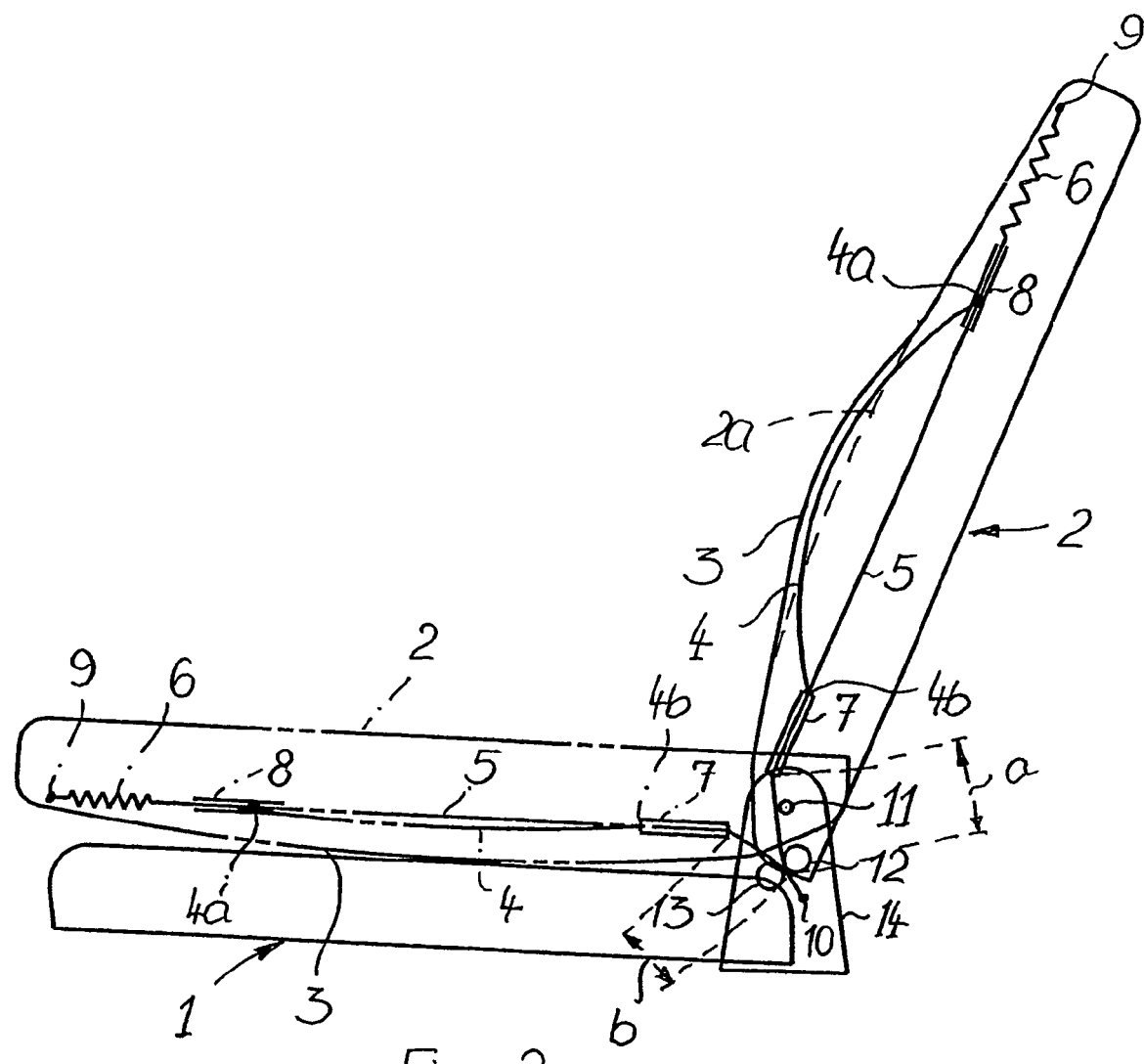
FIG. 2a is a schematic view as in FIG. 1 with the tilted position shown in dashed lines to indicate the tilted position of the seat back as in FIG. 2.

FIG. 2a shows that the pull-cable 5 is routed over the pulley 12 in use position, and over pulley 13 in tilted position, FIG. 2.

The distance a, FIG. 2a between the lower end of the cable guide 7 and the pulley 12 is greater than the distance b between the lower end of the cable guide 7 and the pulley 13 with the seat back 2 in tilted position. Thus when the seat back 2 is tilted forward, the shape of the hoop elements 4 is weaker in the tilted position than when in the use position allowing the seat to fold generally completely flat horizontally, FIG. 2, whereas in the use position, FIGS. 1a and 2a, the cable 5 is pulled tight around pulley 12 forcing hoop element 4 outward for more comfortable user back support.

As mentioned above, the present invention is not intended to be limited to a system or method which must satisfy one or more of any stated or implied object or feature of the invention and should not be limited to the preferred, exemplary, or primary embodiment(s) described herein. For example, the present invention may also be used to form a support area (such as a lumbar support) in the seat back in addition to or as well as the seat back wing. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the claims when interpreted in accordance with the breadth to which they are fairly, legally and equitably entitled.

What is claimed is:

1. An automobile seat with supporting frame, said seat comprising:
   a seat body adapted to be secured to the floor of a vehicle;
   a seat back pivotably connected to said seat body about a tilt axis substantially horizontal to said floor, wherein said seat back is adapted to tilt between a use position wherein said seat back is substantially vertical relative to said seat body and a tilted position wherein said seat back is substantially horizontal relative to said seat body, said seat back including:
   a central portion; and
   at least one side wing disposed along an edge region of said central region along a longitudinal axis of said seat back, said side wing adapted to extend substantially outwardly and generally perpendicular to a longitudinal plane of said central region at all times; and
   means for adjusting a distance that said side wing extends outwardly relative to said central region such that when said seat is disposed in said use position, said side wing extends outwardly from said central region at a distance A from said central region and when said seat is disposed in said tilted position, said wing extends outwardly from said central region at a distance less than A from said central region.

2. The automobile seat as in claim 1, wherein said side wing includes a deformable-elastic hoop element having a generally arc shape extending generally outwardly from said central region.

3. The automobile seat as claimed in claim 2 wherein said deformable-elastic hoop element includes a radius, wherein of said radius is larger when said seat is in said use position than said tilted position.

4. The automobile seat as in claim 3, wherein said deformable-elastic hoop element includes a first and a second anchoring area, said first anchoring area connecting said deformable-elastic hoop element with a supporting frame of said seat back, and said second anchoring area connecting said deformable-elastic hoop element with said means for adjusting.

5. The automobile seat as in claim 4, wherein said means for adjusting includes a pull-cable having a first end connected to a distal region of said seat back and a second end is connected proximate said seat body, wherein said second anchoring area is connected to said pull-cable.

6. The automobile seat as in claim 5, wherein a spring tensions said pull-cable towards said distal region of said seat back.

7. The automobile seat as in claim 5 wherein said pull-cable is routed through at least one cable guide affixed to said supporting frame of said seat back.

8. An automobile seat comprising:
   a seat body adapted to be secured to the floor of a vehicle;
   a seat back pivotably connected to said seat body about a tilt axis substantially horizontal to said floor, wherein said seat back is adapted to tilt between a first position wherein said seat back is substantially vertical relative to said seat body and a second position wherein said seat back is substantially horizontal relative to said seat body; and
   at least one cable having a first end disposed proximate a distal end of said seat back and a second end disposed proximate said seat body, wherein at least a portion of said cable runs along an edge region of said seat back along a longitudinal axis of said seat back; and
   at least one deformable-elastic hoop element disposed along said edge region of said seat back along said longitudinal axis of said seat back, said hoop having a first end that is fixed relative to said seat back and a second end that is secured to said cable, whereby in said first position, said hoop extends substantially outwardly and generally perpendicular to a longitudinal plane of said seat back at a distance A from said seat back and whereby in said second position, said cable and said second end of said hoop move along said longitudinal axis of said seat back such that a distance that said hoop extends outwardly from said seat back is less than A.

9. The seat as claimed in claim 8 further including at least one spring tensioning said cable in said direction said cable moves between said first and said second positions.

10. The seat as claimed in claim 9 wherein said spring is disposed proximate first end of said cable.

11. The seat as claimed in claim 10 further including at least one pulley disposed proximate tilt axis.

12. The seat as claimed in claim 11 wherein said cable is routed through a first and a second cable guide, wherein said first cable guide is disposed within said seat back proximate said tilt axis and said second cable guide is disposed proximate said first end of said cable.

13. The seat as claimed in claim 12 wherein second cable guide is secured said cable and wherein said hoop is secured to said second cable guide such that said second cable guide moves with said cable along said longitudinal axis of said seat back.

14. The seat as claimed in claim 12 wherein a location of said second cable guide is fixed relative to said seat back.

* * * * *